Nov. 16, 1971  D. E. GILBERT  3,619,857
SEALING OPEN END PARISONS

Filed Aug. 18, 1969  2 Sheets-Sheet 1

INVENTOR.
D. E. GILBERT

BY
Young + Quigg

ATTORNEYS

3,619,857
SEALING OPEN END PARISONS
Dixie E. Gilbert, Bartlesville, Okla., assignor to
Phillips Petroleum Company
Filed Aug. 18, 1969, Ser. No. 850,957
Int. Cl. B29d *23/03*
U.S. Cl. 18—5 BQ         7 Claims

ABSTRACT OF THE DISCLOSURE

Open end parisons are held at one end and sealed by means of a device which cooperates with mold parts to thereafter sever the parison. The sealing and severing device can be used to place the parison in the molding zone initially, or the parison can be placed in the molding zone by a separate means with the sealing and severing means reaching in to grasp an open end of the parison and pull it axially to effect longitudinal orientation. In either event, the sealing and severing means maintains sealing pressure against the parison for a sufficient length of time for a seal to form.

BACKGROUND OF THE INVENTION

This invention relates to improvements in sealing open end parison preforms.

Traditionally, blow molded articles have been made by extruding a molten parison downward from an annular die into position between opposing mold halves. The mold halves then close upon the freshly extruded parison, and internal fluid pressure is introduced to expand same out into conformity with the mold walls. Recently, it has been found that high strength hollow articles having exceptional sparkle and clarity can be produced by reheating the parison to orientation temperature at which temperature the blow molding operation is carried out. It is apparent that in the utilization of individual parison preforms for this operation, it would be most economical to form a continuous tubular extrudate and cut it into individual workpieces. However, this results in a workpiece which is open at each end and which, therefore, must be sealed preparatory to use. Herein lies a difficult problem in that the temperature at which orientation takes place is generally about 1–50° below the crystalline melting point, at which temperature the polymer is far too cold to seal well. In order for this process to be commercially feasible from an economic standpoint, it is necessary that this sealing be done with the fewest possible manipultive steps. It has been found that a satisfactory seal can be produced from polymer at this temperature by compressing the walls together with a sealing and severing device which has a recess between the point at which the parison is severed and the bottom wall of the resulting article so as to form a bead along the sealing line. However, the presence of such a bead is sometimes undesirable. Other methods of effecting a seal include closing the sealing means on a parison which has already been stretched and the use of a sealing mechanism which imparts pressure radially inward from a plurality of directions and thereafter exerts pressure from within the parison to form a compression seal.

SUMMARY OF THE INVENTION

It is an object of this invention to provide an improved seal on an open end parison;

It is a further object of this invention to decrease the cycle time in the molding of hollow articles from parison preforms;

It is yet a further object of this invention to eliminate the need for a sealing bead along the sealing line;

It is yet a further object of this invention to simplify the equipment and manipulative steps required to form orietned articles from parison preforms;

It is still yet a further object of this invention to provide biaxially oriented hollow articles of improved quality; and It is a yet further object of this invention to form high strength, high clarity oriented hollow articles from open end parison preforms without the necessity of a separate mechanical stretching step.

In accordance with this invention, a sealing and severing means grips one end of an open end parison preform, moves it into position for molding, and thereafter cooperates with mold parts to effect a severing of the parison.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figure 1:
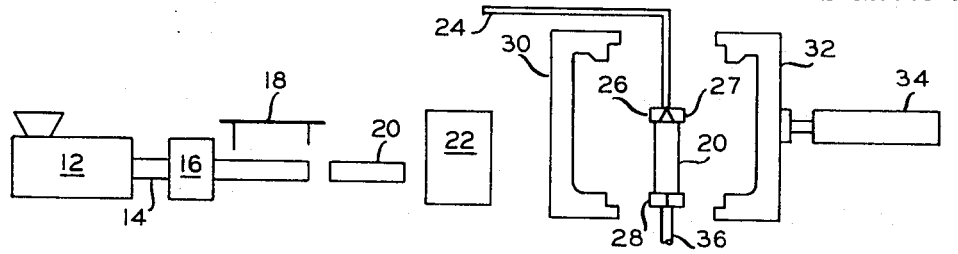
FIG. 1 is a schematic representation of apparatus for forming and subsequently sealing an open end parison in accordance with this invention.

The instant invention is applicable for the sealing of any hollow, open end, elongated parison having a triangular, square, or round shape or the like, although its primary utility will be found in the sealing of cylindrical parison preforms.

The parison preforms which can be stretched in accordance with this invention can be made of any orientable crystalline material such as polymers of at least one mono-1-olefin having 2–8 carbon atoms per molecule, preferably polymers and copolymers of ethylene, propylene, and butene, more preferably polypropylene.

The parison preforms sealed in accordance with this invention can be formed by any suitable means, although the preferred means is to simply extrude a tube or pipe in a manner known in the art, and thereafter sever this continuous extrudate into workpieces of the desired length. The parison preforms are heated to orientation temperature preparatory to sealing and blow molding. By orientation temperature, it is meant that temperature at which the crystalline polymers on stretching exhibit an increase in strength. For polymers of mono-1-olefins having 2–8 carbon atoms per molecule, this temperature is generally in the range of 1–50° F., preferably 10–30° F., below the crystalline melting point. The crystalline melting point can be determined by placing a small sample of the material to be tested on the heating stage of a polarizing microscope and recording the crystalline melting point as that temperature at which the last birefringence disappears on slow heating. The parison preforms can be reheated to this orientation temperature in an air oven, in a liquid bath, in a heating block, or by subjecting them to radiant heat, or any other suitable means.

The essential feature of this invention is that by providing a sealing and severing means which grips one end of an open end parison and moves it into position so that the mold halves cooperate with this sealing and severing means to effect the final formation of the article, sufficient time elapses during the time the sealing and severing means is moving the end of the parison which it grips into position within the molding zone that a seal can be effected. This time lapse can occur, in one embodiment, between the point at which the parison is initially gripped and the point at which it is inserted into a thread-forming means or the like which holds the opposite end. In embodiments where the parison is thereafter stretched longitudinally by axial movement between the thread-forming means holding one end and the sealing and severing means holding the other end, additional time is provided for a seal. These represent the preferred embodiments, although it is also within the scope of the invention to insert the parison in a thread-forming means or the like by any suitable equipment and thereafter reach into the molding zone to grip the open end of the parison; time for the seal to be effected elapses as relative axial movement is effected between the means holding the first end of the parison and the sealing and severing means holding the second end.

In the embodiments where there is an affirmative axial movement between the thread-forming means or the like holding the first end of the parison and the sealing and severing means holding the second end, this mechanical stretching will generally effect a stretch ratio of within the range of 1.1:1 to 8:1, preferably 1.5:1 to 2.5:1. By longitudinal stretch ratio is meant the ratio of the length of that portion being stretched (i.e., the portion of the parison between the thread-forming head or the like and the sealing and severing means) after stretching to its length before stretching. Even with no affirmative mechanical stretching (to give a ratio of 1:1), there is still theoretically at least a slight longitudinal component of the stretching when the parison is expanded by internal fluid pressure into conformity with the mold halves. Thus, operating in accordance with this invention makes possible the production of oriented closed end, hollow articles having high strength and clarity with a bare minimum of manipulative steps, including the option of forming such articles from parisons which have not undergone any mechanical axial stretch with the seal being effected during the time that the parison is transferred into position by means of the sealing and severing jaws. In all embodiments of the invention, less scrap is produced than when the seal is effected by closing on a stretched length of the parison.

It has been found that in some instances, it is preferred to preblow the parison slightly before the mold halves close. By careful timing of the sequence of steps wherein the preblow fluid is introduced to the sealed off parison just after the mold halves begin to close, preblow fluid under the pressure normally utilized for the main blow, that is, a pressure of 60–200, preferably 90–150 p.s.i.g., can be utilized as the preblow fluid also. In all events where preblow is utilized, a higher pressure must be utilized than the 3–6 p.s.i.g., which is standard in the industry for preblowing thoroughly molten parisons. Generally, a preblow pressure of at least 25 p.s.i.g., preferably at least 25–50 p.s.i.g., is utilized.

Figure 6:
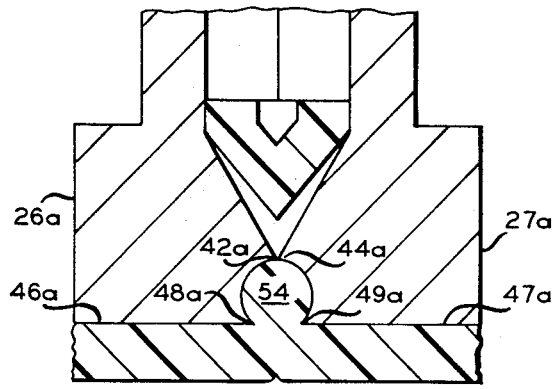
FIG. 6 is a view similar to FIG. 4 showing an alternate embodiment of the invention.

Because the open end parison is compressed between the sealing and severing jaws during the time it is moved into position in the molding zone, during which time lapse a seal can be effected, even at orientation temperature, greater leeway is provided in designing the shape of the sealing and severing means. Preferably, the sealing and severing means has a configuration such as is shown in FIG. 6 comprising a severing edge which is the furthermost extension thereof; this severing edge cooperates with a matching edge on the opposing sealing and severing jaw means to sever the parison. Preferably, these edges are disposed so as to project past a theoretical center line between the two closed mold parts for a distance of 0.5–5, preferably 1–4 mils. Adjacent a bottom wall-forming portion of the sealing and severing means is a second projection which cooperates with a matching projection on the opposite sealing and severing jaw means to hold said pinched-together parison within a bead-forming cavity, to be described hereinbelow. This cavity, which, in cooperation with a matching cavity on the other sealing and severing means, forms a bead-forming mold. Preferably, this cavity has a circular configuration, although other configurations can also be used.

Figure 4:
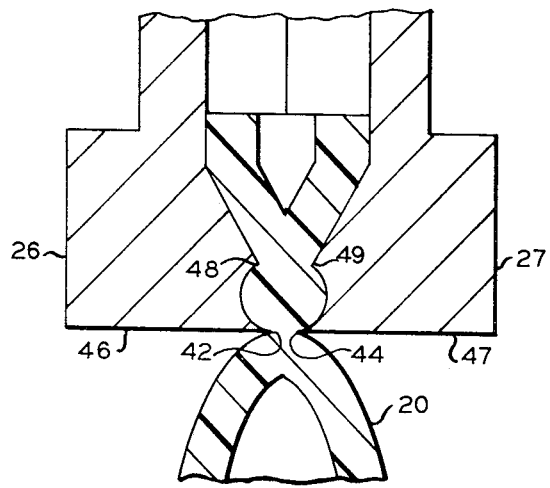
FIG. 4 is a fragmentary view in section of the sealing means at the portion of the cycle shown in FIG. 2.

Alternatively, the sealing and severing means can be provided with a cutting projection, which is the furthermost extension thereof, which is adjacent the bottom wall-forming portion of the sealing and severing means, with a second projection spaced apart a short distance from the severing projection, the space therebetween being offset slightly to form one half of a bead-forming cavity as shown in FIG. 4. The net result of this configuration is that the bead which is formed becomes a part of the tail section which is cut off and discarded. In either event, the presence of the bead prior to the time the sealing and severing means are closed to their furthermost extension so as to sever the parison serves the dual function of providing a better grip on the parison to hold it during axial stretching and to effect flow of polymer and more intimate contact of polymer in the seal and severing area.

The opposed jaws of the sealing and severing means come together initially a distance sufficient to close off and seal the parison. Thereafter, they are forced forward the additional amount required to sever the parison. Preferably, this final forward motion is effected by the action of the mold halves coming into contact with the opposed sealing and severing means as the mold halves close.

Referring now to the figures, particularly FIG. 1, there is shown an extrusion means 12 for forming an elongated tubular extrudate 14. Extrudate 14 passes through vacuum cooling and sizing chamber 16 and thence past cutter 18 where it is severed into individual workpieces or open end parison preforms 20. Parison preforms 20 are placed over vertically disposed pins on a continuous chain (not shown) within air oven 22 where they are heated to orientation temperature. A parison transfer device comprising arm means 24 and parison sealing and severing jaw means 26 and 27 reaches down into oven 22 and grips a parison by means of sealing and severing jaws 26 and 27 closing about the upper open end of the parison. Thereafter, through the action of arm means 24, the parison is lifted upwardly out of the oven, transferred laterally, and thereafter transferred down so as to engage the opposite end thereof in a thread-forming head 28 comprising a plurality of jaw means with a centrally disposed mandrel. This internal plug 31 is shown in FIG. 3. Thread-forming head 28 can be identical to that shown in Turner et al., U.S. 3,390,426, the disclosure of which is hereby incorporated by reference. Thread-forming head 28 is in a fixed position and disposed adjacent the neck-forming end of the bottle mold which comprises mold halves 30 and 32. The jaws of thread-forming head 28 securely clamp the opposite end of the parison and thereafter sealing and severing jaw means 26 and 27 move upwardly to stretch the parison axially. These jaw means terminate the upward movement at a bottom-forming end of the mold. The mold is then closed by means of air cylinder 34. As the mold halves close, preblow air is introduced through line 36. This stage of the operation is shown in detail in FIGS. 2 and 4.

Figure 2:
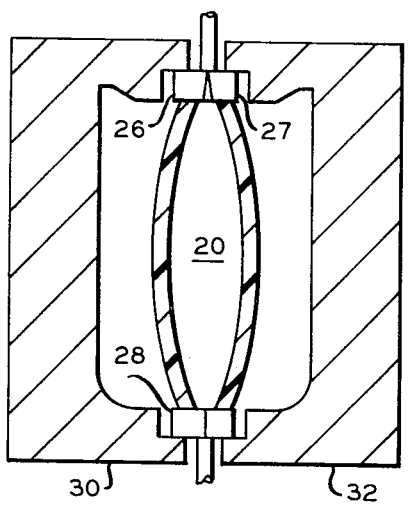
FIG. 2 is a detailed view of the mold and parison holding means of FIG. 1.
Figure 3:
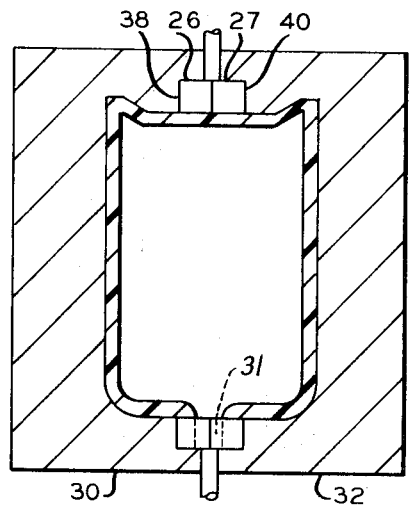
FIG. 3 is a view similar to FIG. 2 at a later stage in the operation.
Figure 5:
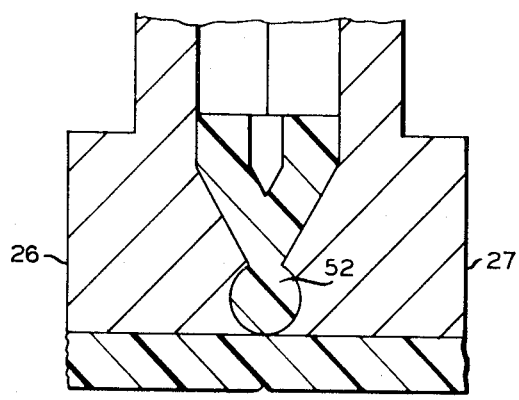
FIG. 5 is a fragmentary sectional view of the sealing and severing means at the portion of the cycle shown in FIG. 3.

As can be seen from a view of FIGS. 2 and 4, sealing and severing jaws 26 and 27 closed sufficiently on the parison when it was gripped in the heating oven to force the walls into intimate contact, but not sufficient to sever the parison. As can be seen from a view of FIGS. 3 and 5, as the mold halves close completely, leading edges 38 and 40 of mold halves 30 and 32, respectively, contact sealing and severing jaws 26 and 27 to cause them to close completely, thus severing the parison. As can be seen from a view of FIG. 4, for instance, jaw means 26 and 27 have leading cutting edges 42 and 44, respectively, disposed adjacent bottom wall-forming surfaces 46 and 47 of said jaw means. Spaced back a short distance from leading cutting edges 42 and 44 are holding projections 48 and 49. The leading surfaces of jaw means 26 and 27 between the cutting edge and the holding projection are recessed back slightly to form bead-forming cavity 52 as shown in FIG. 5.

In FIG. 6, there is shown an alternative embodiment of the configuration of the leading edges of the jaw means wherein sealing and severing jaws 26a and 27a have leading cutting edges 42a and 44a which are disposed back a short distance from bottom wall-forming surfaces 46a and 47a with the holding projections 48a and 49a being disposed adjacent said bottom wall-forming surfaces 46a and 47a. As can be seen, this arrangement leaves a bead attached to the bottom wall of the article being molded. However, as can be seen from the configuration of the mold in FIGS. 1-3, this bead will be in a recessed portion of the bottom of the container, and therefore, the container can still sit flat on a level surface.

Figure 7:
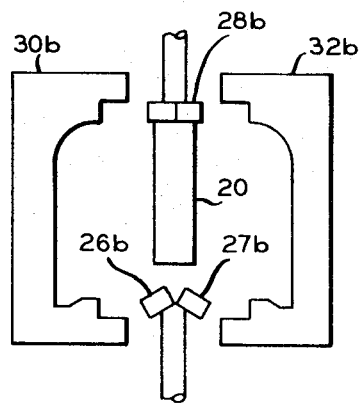
FIG. 7 is a view of mold means and a sealing and severing means in accordance with an alternate embodiment of the invention.

In FIG. 7, there is shown another alternate embodiment of the invention wherein the parison 20 is positioned within thread-forming head 28b by a separate means not shown. The sealing and severing jaw means 26b and 27b then reach up to grasp the opposite end thereof. In this embodiment, the entire mechanism is disposed in an upside down relationship to that shown in the other figures, with the neck-forming portion of the mold halves 30b and 32b being at the top.

Figure 8:
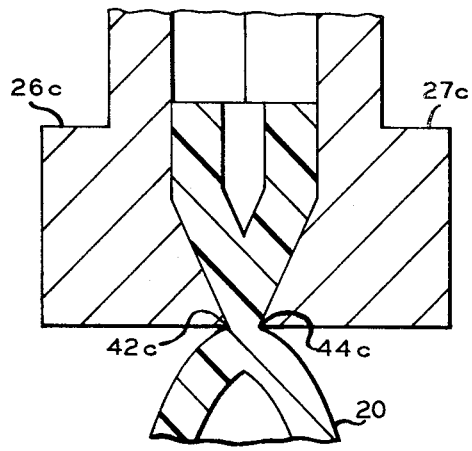
FIG. 8 is a fragmentary view in section of another alternate embodiment of the sealing and severing means.

FIG. 8 shows another alternate embodiment of the invention wherein the sealing and severing jaws 26c and 27c have only the leading cutting edges 42c and 44c.

Figure 9:
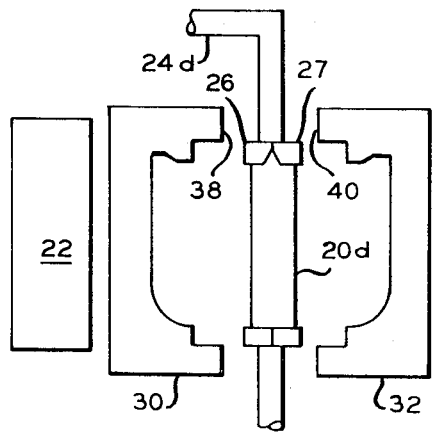
FIG. 9 is a schematic view of another alternate embodiment.

FIG. 9 shows a schematic representation of another alternate embodiment of the invention wherein arm means 24d carrying sealing and severing jaw means 26 and 27 transfers parison 20d into position between mold halves 30 and 32 with the parison length being such that jaw means 26 and 27 are in the proper position initially for cooperating with leading edges 38 and 40 of the mold halves.

Figure 10:
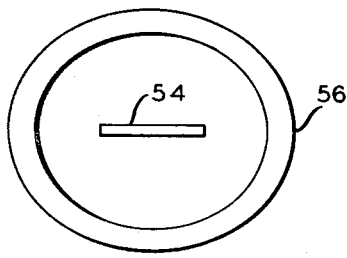
FIG. 10 is a bottom view of a bottle sealed in accordance with the invention.

In FIG. 10 there is shown a bottle 56 showing sealing bead 54 in a recess of the bottom thereof.

Many conventional parts such as heating coils, temperature regulators, control switches, cooling coils, and the like have been omitted from the above drawings for the sake of simplicity, but their inclusion is understood by those skilled in the art and is within the scope of the invention.

EXAMPLE I

Polypropylene homopolymer having a density of 0.905 (ASTM D1505-63T), a melt flow of 2 (ASTM D1238-62T, Condition L), and a crystalline melting point of about 340° F. was extruded into tubing having an outside diameter of 0.8-inch and a wall thickness of 0.150-inch. The tubing was cooled to room temperature in a vacuum sizing and quenching chamber and cut into 5-inch lengths. These 5-inch lengths were heated to a temperature of about 320° F. The thus heated parison was gripped at one open end thereof with sealing and severing jaws having the configuration shown in FIG. 6. These jaws closed sufficiently to flatten the walls of the parison and force them into intimate contact, but not to sever it, and transferred the parison into a molding zone, placing the other open end in a thread-forming head such as head 28 shown in FIG. 1. Thereafter, thread-forming head 28 gripped the other open end of the parison and the gripping and sealing jaws were moved axially relative to the thread-forming head to longitudinally stretch the parison. During this time, a true fusion seal was forming in the seal area. Thereafter, while the parison was still at orientation temperature, mold halves such as those shown in FIG. 1, were closed upon the parison in a manner shown in FIGS. 2 and 3 to force the sealing and severing jaws closed thus severing the parison at a point just below the seal. Internal fluid pressure expanded the parison into conformity with the mold to give a clear, high strength bottle having a good seal.

EXAMPLE II

Polypropylene homopolymer having a density of 0.905 (ASTM D1505-63T), a melt flow of 2 (ASTM D1238-62T, Condition L), and a crystalline melting point of about 340° F. was extruded into tubing having an outside diameter of 0.8-inch and a wall thickness of 0.100-inch. The tubing was cooled to room temperature in a vacuum sizing and quenching chamber and cut into about 7-inch lengths. These lengths were heated to a temperature of 320° F. and grasped at one open end thereof by means of sealing and severing jaws having the configuration shown in FIG. 6. The sealing and severing jaws were converged sufficiently to close the walls of the parison together, but not sufficiently to sever the parison. Thereafter, the parison was transferred by means of the sealing and severing jaws to a molding zone such as is shown in FIG. 9, during which time the seal was forming. The parison was of such length that on being placed in the molding zone, the sealing and severing jaws were aligned with a bottom end-forming portion of the mold, as shown in FIG. 9. The mold halves were then closed upon the sealing and severing jaws, causing them to converge a slight additional amount, severing the parison. The parison was expanded by internal fluid pressure into conformity with the mold walls to give an oriented, high strength, highly transparent article, having a good bottom seal, which was a true fusion seal.

ILLUSTRATIVE EMBODIMENT I

Polypropylene homopolymer having a density of 0.905 (ASTM D1505-63T), a melt flow of 2 (ASTM D1238-62T, Condition L), and a crystalline melting point of 340° F. is extruded into tubing having an outside diameter of 0.8-inch and a wall thickness of 0.150-inch. The tubing is cooled to room temperature in a vacuum sizing and quenching chamber and is cut into 7-inch lengths. These 7-inch lengths are heated to a temperature of 320° F. The thus heated blanks are gripped at one open end thereof with sealing and severing jaws having the configuration shown in FIG. 4 and said jaws are converged sufficiently to press the walls of the parison together, but not sufficiently to sever the parison. The parison is then transferred into a molding zone such as is shown in FIG. 1 by means of said sealing and severing jaws which place the other open end of the parison in a thread-forming head, such as head 28 shown in FIG. 1. Thereafter, these sealing and severing jaws are moved upwardly to axially stretch the parison and the mold walls are closed, contacting the sealing and severing jaws to cause them to converge a slight additional distance, as shown in FIGS. 2-5, thus severing the parison at a point flush with the bottom wall of the article being formed, as specifically shown in FIG. 5. Internal fluid pressure is admitted into the interior of the parison to expand it out into conformity with the mold walls. The mold halves are then opened and a biaxially oriented bottle having tough walls, exceptional clarity, and a good bottom seal is removed. The seal is a true fusion seal.

ILLUSTRATIVE EMBODIMENT II

Polypropylene homopolymer having a density of 0.905 (ASTM D1505-63T), a melt flow of 2 (ASTM D1238-62T, Condition L), and a crystalline melting point of 340° F. is extruded into tubing having an outside diameter of 0.8-inch and a wall thickness of 0.150-inch. The tubing is cooled to room temperature in a vacuum sizing and quenching chamber and is cut into 7-inch lengths. These 7-inch lengths are heated to a temperature of 320° F. in an air oven and an open end thereof grasped by means of sealing and severing jaws having the configuration shown in FIG. 8. These sealing and severing jaws converge a sufficient amount to flatten the walls of the parison together, but not a sufficient amount to sever the parison. Thereafter, the parison is transferred to a molding zone such as that shown in FIG. 1, during which time a true fusion seal is forming. Thereafter, mold walls close upon the parison contacting the sealing and severing jaws, causing them to converge a slight additional amount to sever the parison. Fluid pressure is introduced into the interior of the parison, expanding it out into conformity with the mold walls, and the mold is opened to remove the resulting product, an oriented bottle having strong wall sections, exceptional clarity, and a good bottom seal.

While this invention has been described in detail for the purpose of illustration, it is not to be construed as limited thereby, but is intended to cover all changes and modifications within the spirit and scope thereof.

I claim:

1. Apparatus for molding hollow articles from open end parison preforms comprising in combination: a first mold half; a second mold half; means for holding a first end of said parison, said holding means being disposed adjacent a first end of a mold formed by said two mold halves; sealing and severing means separate from said mold means adapted to grip a second end of said parison, said sealing and severing means comprising at least two jaw means; means to open and close said mold halves; means to move said sealing and severing means axially into position adjacent a second end of said mold, so that on closing said mold halves, said sealing and severing means cooperate with said mold halves to form a bottom wall-forming section of said mold.

2. Apparatus according to claim 1 wherein said holding means comprises at least two jaw members and an internal plug.

3. Apparatus according to claim 2 wherein said sealing and severing means comprises two opposed sealing and severing jaws, each of which has an outer bottom wall-forming surface terminating in a sharp leading edge which cooperates with the identical element of the opposing jaw to sever said parison flush with a bottom wall of the article being molded.

4. Apparatus according to claim 3 wherein each sealing and severing jaw has a projection spaced a short distance back from said sharp leading edge, each of said jaws further having a recess between said sharp leading edge and said projection.

5. Apparatus according to claim 4 wherein a cavity formed by the cooperation of the matching recesses of said opposing jaw members is circular.

6. Apparatus according to claim 2 wherein said sealing and severing means comprises two opposed jaws, each of which has an outer bottom wall-forming surface terminating in a holding projection, a sharp edge spaced back a short distance from said projection, said sharp edge extending beyond said holding projection, so that when said sealing and severing jaws are in their most advanced position, said sharp edges of said opposed jaws cooperate to cut said parison preform, each of said jaws further having a recess between said holding projection and said sharp edge.

7. Apparatus according to claim 6 wherein said sharp edges project past a center line separating the two opposing jaw means a distance of 0.5 to 5 mils when said jaw means are in their forwardmost position.

References Cited
UNITED STATES PATENTS

| | | | |
|---|---|---|---|
| 3,428,722 | 2/1969 | Chittenden et al. | 18—5 BS X |
| 3,449,792 | 6/1969 | Plummer | 18—5 BH |
| 3,505,440 | 4/1970 | Mason | 18—5 BE X |

H. A. KILBY, JR., Primary Examiner

U.S. Cl. X.R.

18—5 BS